US007333608B2

(12) United States Patent
Seitner

(10) Patent No.: US 7,333,608 B2
(45) **Date of Patent: *Feb. 19, 2008**

(54) ANALOG SCRAMBLER

(75) Inventor: Jack Elias Seitner, Doylestown, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 286 days.

This patent is subject to a terminal disclaimer.

(21) Appl. No.: 11/152,113

(22) Filed: Jun. 15, 2005

(65) Prior Publication Data

US 2005/0231402 A1 Oct. 20, 2005

Related U.S. Application Data

(63) Continuation of application No. 10/080,560, filed on Feb. 25, 2002, now Pat. No. 6,973,188.

(51) Int. Cl.
*H04B 1/68* (2006.01)
*H04L 9/00* (2006.01)
*H04K 1/04* (2006.01)

(52) U.S. Cl. .......................... 380/38; 380/44; 455/203

(58) Field of Classification Search .................. 380/38
See application file for complete search history.

(56) References Cited

U.S. PATENT DOCUMENTS 3,610,828 A 10/1971 Girard et al.
4,071,692 A 1/1978 Weir et al.
4,112,369 A 9/1978 Forman et al.
4,208,739 A 6/1980 Lu et al.
4,213,101 A 7/1980 Policand et al.
4,688,218 A 8/1987 Blineau et al.
4,723,246 A 2/1988 Weldon, Jr.
4,752,953 A 6/1988 Paik et al.
4,771,463 A 9/1988 Beeman
4,790,013 A 12/1988 Kage
4,817,192 A * 3/1989 Phillips et al. ................ 455/75
4,972,480 A 11/1990 Rosen
5,022,078 A 6/1991 Zelenz
5,144,669 A 9/1992 Faulkner et al.
5,278,907 A 1/1994 Snyder et al.
5,283,831 A 2/1994 Cook et al.
5,341,423 A 8/1994 Nossen
5,428,361 A 6/1995 Hightower et al.
5,493,612 A * 2/1996 Klund et al. ................ 380/253
5,530,756 A 6/1996 Bourel et al.
5,555,305 A 9/1996 Robinson et al.
5,561,714 A 10/1996 Hershberger
5,596,570 A 1/1997 Soliman
5,745,522 A 4/1998 Heegard
5,822,429 A 10/1998 Casabona et al.
5,848,160 A * 12/1998 Cai et al. ...................... 380/44
5,894,517 A 4/1999 Hutchison et al.
5,912,973 A 6/1999 Hiramatsu et al.
6,973,188 B1 * 12/2005 Seitner ........................ 380/38

(Continued)

*Primary Examiner*—Matthew Heneghan
(74) *Attorney, Agent, or Firm*—McDermott Will & Emery LLP

(57) ABSTRACT

An analog signal scrambler/de-scrambler includes a receiver for receiving an analog signal and converting the signal into an intermediate frequency signal. A generator generates a pseudo-random gaussian frequency distribution signal, which is multiplied with the intermediate frequency signal by a frequency converter to scramble/de-scramble the analog signal.

10 Claims, 8 Drawing Sheets

U.S. PATENT DOCUMENTS

2001/0036274 A1 11/2001 Antoine
2002/0034297 A1 3/2002 Rhoads
2003/0118186 A1 6/2003 Gilley

* cited by examiner

ANALOG SCRAMBLER

This application is a continuation of application Ser. No. 10/080,560, filed on Feb. 25, 2002.

BACKGROUND OF THE INVENTION

The ability to securely transmit information between two locations is of paramount importance in today's communication systems. Before the invention of digital transmission methods, analog encryption was commonplace. However, today's communication systems rely almost exclusively on transmitting information digitally. Digital transmission has become commonplace because it provides optimal accuracy and security. While it is optimal for many applications, digital transmission also creates a major disadvantage. In order to convert an analog signal into the digital domain, analog information must be sampled in accordance with, for example, the nyquist sampling theorem. According to this theorem, an analog signal should be sampled at twice the frequency of the analog signal. Therefore, transmitting information digitally requires the necessary bandwidth to be a function of the sampling frequency, the number of bits per sample, and the bandwidth efficiency of the modulator. For many systems, this can drastically increase the bandwidth that is required. In certain applications where bandwidth is limited, analog transmission can be more efficient. However, because of the increased accuracy and encryption ability afforded by digital transmission, current secure communication systems have not focused on securely transmitting data in the analog domain.

A continuing need exists for improved methods and apparatus that can transmit analog data securely while minimizing the distortion of information.

SUMMARY OF THE INVENTION

An object of the present invention is to provide secure analog transmission.

An object of the present invention is to provide a single side-band analog scrambler to scramble analog signals in such a manner that usable information cannot be extracted by an unauthorized receiver.

A further object of the present invention is to provide secure analog transmission with a wide information bandwidth and large dynamic signal range in a de-scrambled signal.

A further object of the present invention is to minimize information signal distortions in a de-scrambled signal.

To achieve the above and other objects, the present invention provides a method for scrambling an analog signal, comprising: receiving an analog signal; converting the received analog signal into an intermediate frequency signal; generating a gaussian pseudo-random noise signal; and combining the intermediate frequency signal and the gaussian pseudo-random noise signal.

To achieve the above and other objects, the present invention further provides a method for de-scrambling an analog signal, comprising: receiving a scrambled analog signal; converting the analog signal into an intermediate frequency signal; generating a gaussian pseudo-random noise signal; and combining the intermediate frequency signal and the gaussian pseudo-random noise signal.

To achieve the above and other objects, the present invention further provides a method for scrambling and de-scrambling an analog signal, comprising: receiving the analog signal; converting the received analog signal into an intermediate frequency signal; generating a gaussian pseudo-random noise signal; generating a scrambled signal based on the intermediate frequency signal and the gaussian pseudo-random noise signal; converting the scrambled signal into a second intermediate frequency signal; generating a second gaussian pseudo-random noise signal; and de-scrambling the scrambled signal based on the second intermediate frequency signal and the gaussian pseudo-random noise signal.

Other and further objects of the present invention will be apparent from the following description and claims and are illustrated in the accompanying drawings, which by way of illustration, show preferred embodiments of the present invention. Other embodiments of the invention embodying the same or equivalent principles may be used and structural changes may be made as desired by those skilled in art without departing from the present invention and the purview of the appended claims.

DETAILED DESCRIPTION OF THE PREFERRED EMBODIMENTS

Figure 1:
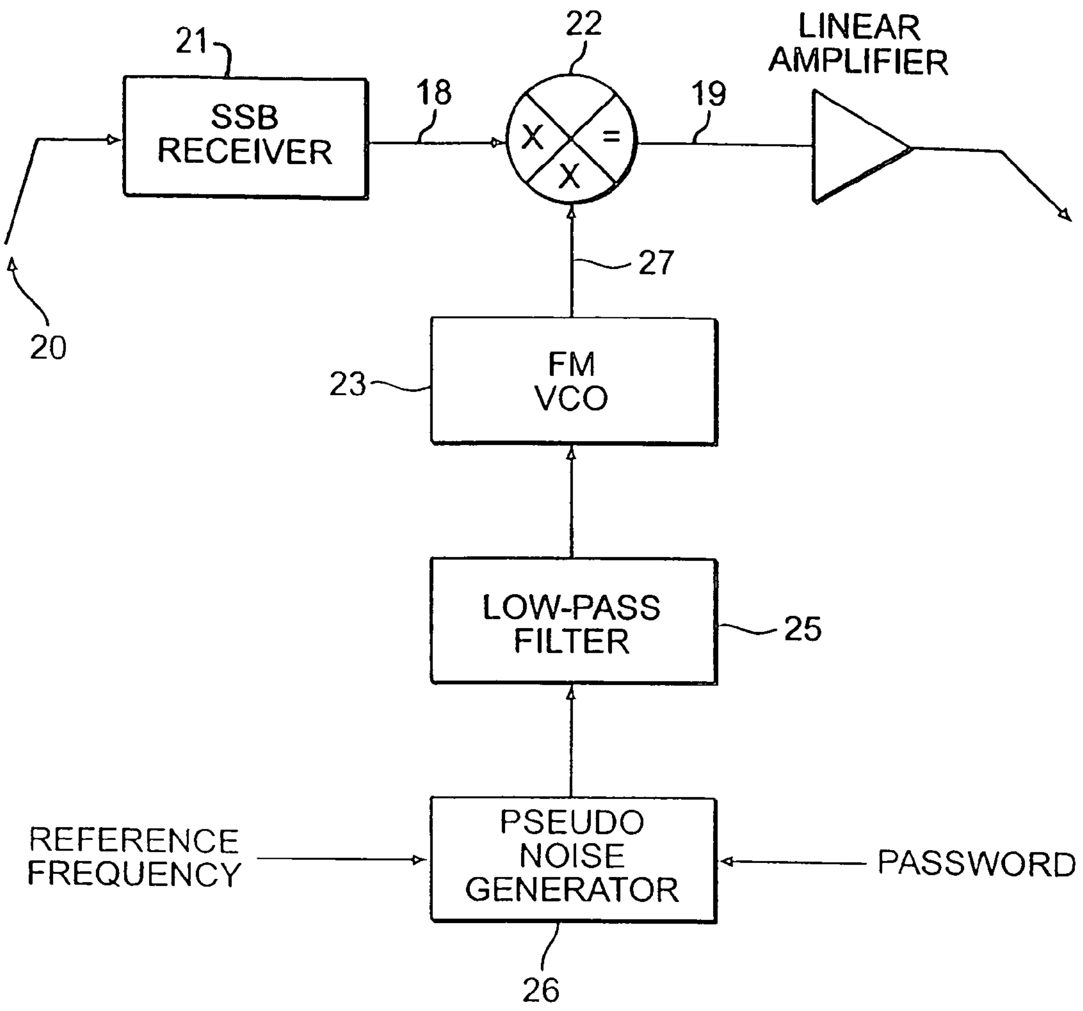
FIG. 1 is a block diagram of an exemplary embodiment of a transmitter embodying the present invention.

FIG. 1 is a block diagram of an exemplary embodiment of a transmitter embodying the present invention. The transmitter can be ground, air or space based. In the FIG. 1 exemplary embodiment, a single side band receiver 21 receives an information signal 20. The single side band receiver 21 translates the received signal to an intermediate frequency (IF) signal 18. Typically, the IF signal 18 is a linear replica of the received signal translated over the IF bandwidth. Generating a linear replica of the received signal is desirable in order to avoid inter-modulation products. Non-linear signals would include higher order harmonics of the original signal, that could result in significant distortion of the IF signal 18. To prevent unauthorized access of the information signal, the IF signal 18 is scrambled. In the FIG. 1 embodiment of the present invention, the scrambling is accomplished by combining the IF signal 18 with a local oscillator signal 27. Once this occurs, the presence or nature of the original information signal 20 cannot be detected by unauthorized parties.

In accordance with a preferred embodiment of the present invention, the local oscillator signal 27 is generated through three steps. This is only one example and the present invention is not limited to any particular steps or sequence thereof. In the exemplary embodiment a pseudo-random noise generator 26 generates bits of a digital pseudo-random noise signal. The signal is referred to as pseudo-random because it includes additional frequencies that do not correspond to a random noise signal. This digital signal is generated according to a reference frequency and a password. If nyquist sampling is used, the reference frequency determines the base sampling rate of the digital signal. In the preferred embodiment, the password is generated by a sequence generator. Only a user with knowledge of the generated sequence (e.g., the password) can de-scramble the scrambled signal.

In order to convert the digital pseudo-random noise signal into an analog random noise signal, the part of the spectrum with a bit rate that does not correspond to a random noise signal must be removed. In this embodiment, this is accomplished through the use of a low pass filter. The filter removes the parts of the original pseudo-random spectrum that do not correspond to a random noise signal. In the exemplary embodiment, the random noise signal is converted to a gaussian frequency distribution in order to scramble the IF signal 18. This can be accomplished by various techniques. One exemplary technique is to use a voltage controlled oscillator (VCO) 23. The output spectrum of the VCO 23 is assumed to have a gaussian distribution for a significantly large number of independent modulating voltages. This is because the VCO 23 is a voltage to frequency converter. The output spectrum of the VCO 23 is called the local oscillator signal 27. The local oscillator signal 27 is combined with the IF signal 18 at the frequency converter 22. The resulting signal has a frequency equal to the sum of the two input signals. In the preferred embodiment, this signal is in the radio frequency spectrum. The scrambled radio frequency signal 19 can now be transmitted. A transmitter to transmit the scrambled RF signal 19 can be included at the output of the frequency converter 22. In the preferred embodiment, a linear amplifier is used to amplify the signal for transmission. Of course, this embodiment can be changed according to the specific application.

Figure 2:
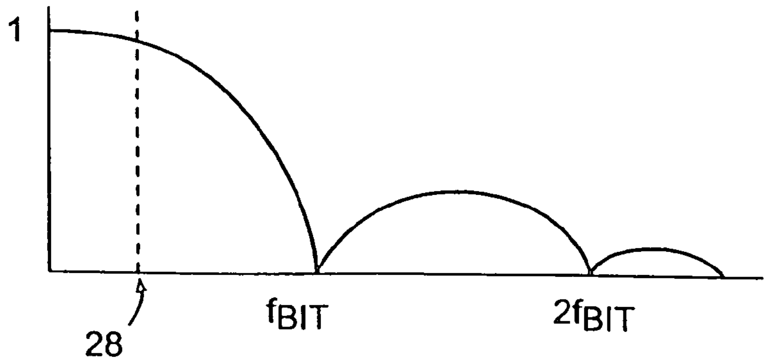
FIG. 2 is a graph showing the characteristics of the output of the pseudo-random noise generator shown in FIG. 1.

FIG. 2 is a graph showing the characteristics of the output of the pseudo-random noise generator 26 shown in FIG. 1. Frequency measured in hertz is shown on the horizontal axis and power measured in watts/hertz is shown on the vertical axis. The graph shows the output signal of the pseudo-random noise generator 26. A signal power of 1.0 watts/hertz corresponds to the spectrum of a random noise signal. Therefore, in order to convert the pseudo-random signal into a random signal, frequencies of the original signal that have a power that does not correspond to random noise should be removed. The power spectrum is nearly, but not necessarily flat, with an approximate power of 1.0 watts/hertz, for the points to the left of and including line 28. In the preferred embodiment, frequencies to the right of line 28 preferably should be filtered out in order to scramble the IF signal 18 (FIG. 1). If these frequencies were not removed, it may be difficult to adequately scramble the IF signal 18. The IF signal 18 would then be electronically visible to unauthorized users.

Figure 3:
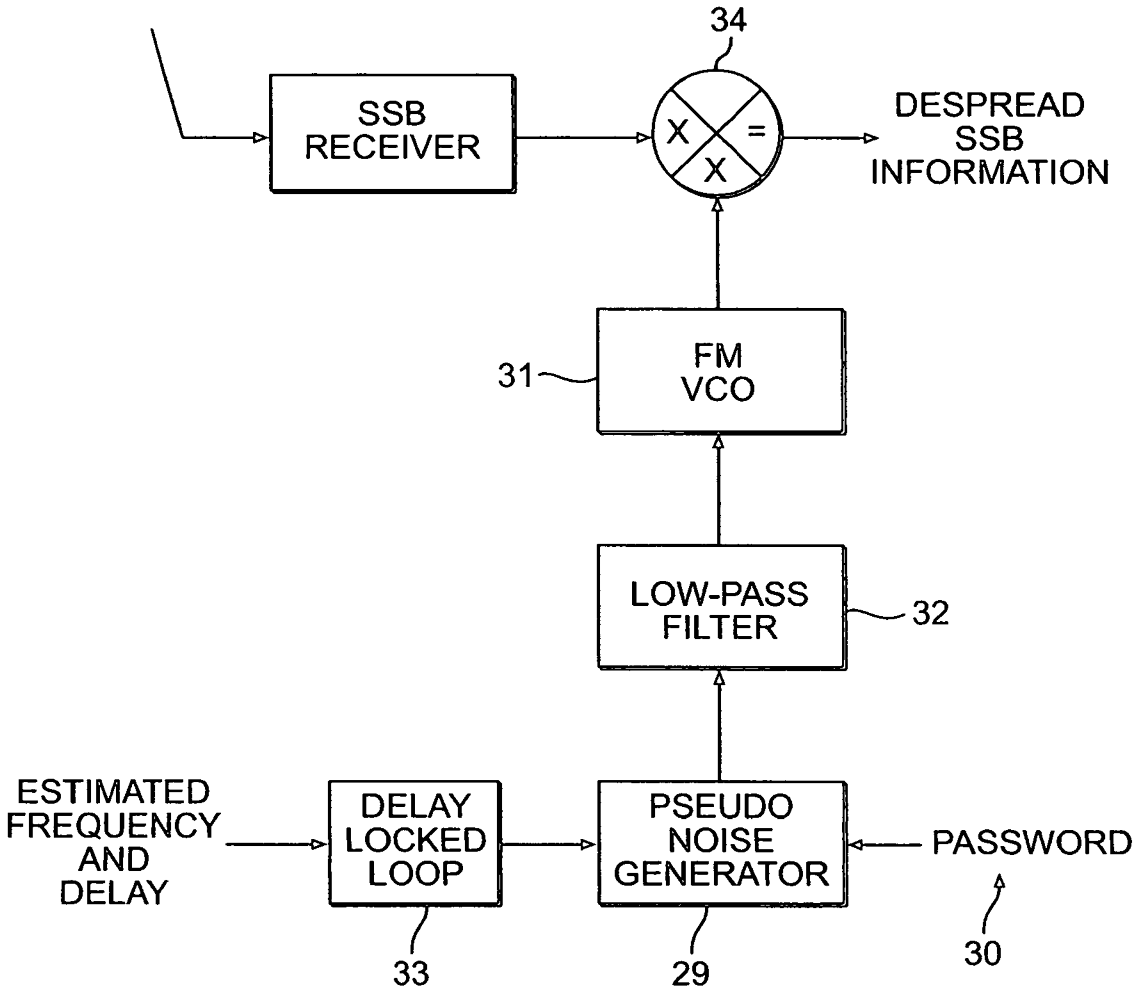
FIG. 3 is a block diagram of an exemplary embodiment of a receiver embodying the present invention.

FIG. 3 is a block diagram of an exemplary embodiment of a receiver segment embodying the present invention. This segment essentially performs the reverse function of the transmitter segment (FIG. 1). The functions of the individual parts should be substantially similar to the transmitter segment. However, in order to generate the proper pseudo-random noise signal necessary for de-scrambling, additional inputs to the pseudo-random noise generator 24 are used.

An authorized receiver can de-scramble the received RF signal 19 by using a pseudo-random noise generator 29 with a password 30 that is substantially the same as that of the transmitter segment (FIG. 1). In the preferred embodiment, the two factors that help provide proper de-scrambling of the received RF signal 19 are:

1. The receiver segment VCO 31 performance should be substantially the same as the performance of the transmitter segment VCO 23 (FIG. 1).
2. The input to the receiver segment VCO 31 should be similar to the input of the transmitter segment VCO 23. Preferred similarities include:
   a. The transmitter segment low-pass filter 25 and the receiver segment low-pass filter 32 should have similar response characteristics.
   b. The pseudo-random noise delay of the receiver segment should be adjusted according to the time delay. The delay is due to the transmission of the information from the transmitter to the receiver. It is dependent on the distance between the transmitter and the receiver. In order to properly de-scramble the signal at the receiver, this transmission delay should be accounted for.

In the preferred embodiment, a delay locked loop 33 can be implemented to account for the transmission delay. The delay locked loop 33 operates as follows:

1. The frequency of the pseudo-random noise generator of the receiver segment is adjusted using a pilot tone generated by the transmitter segment (FIG. 1). The pilot tone is generated according to a predetermined reference frequency. The receiver then generates a pilot tone that is substantially close to the delay of the transmitted pilot tone. Next, the receiver adjusts so that its pilot tone is in synchronization with the transmitted pilot tone. These adjustments are carried out by the delay locked loop 33. The delay locked loop measures the difference between the receiver segment pilot tone and the transmitted pilot tone. It then changes the pilot tone of the receiver so that it is substantially similar to the transmitted pilot tone. While the transmitter segment is searching for the correct delay, the received signal will continue to appear scrambled. The scrambled signal will be de-spread, having a low energy. Once the correct frequency is achieved, the pilot tone output increases significantly because an intelligible signal is now detected. This indicates the pseudo-random noise delays of the transmitter and receiver are substantially similar. This operation is referred to as a code search.
2. When the code search has completed, a code tracking operation is initiated. The code tracking operation is necessary to ensure that the pseudo-random noise delays of the transmitter and receiver remain substantially similar. This allows the receiver to receive and constantly decode the transmitted RF signal 19 (FIG. 1). Without the code tracking operation, there would be interruptions in the decoding capability of the receiver. In the preferred embodiment, the code tracking operation occurs inside the delay locked loop 33; during the code tracking operation a sequence generator (similar to the password generator in the transmitter) is advanced by one-half a pseudo-random noise sequence bit, and another sequence generator is delayed by one-half a bit. The sequence generators constantly adjust their delay times in order to match the delay of the transmitted RF signal 19 (FIG. 1). When the delay time of the delay locked loop 33 matches the delay of the RF signal 19 (FIG. 1), the code tracking output stays the same. This process, which is widely used by those skilled in related art, is carried out through an early-late gate present in the delay locked loop 33. If the delay of the transmitted RF signal 19 changes, the early-late gate in the delay locked loop 33 adjusts to compensate for the change. In this way, the delay locked loop 33 can keep the delays of the transmitter and receiver in synchronization.

This method can be changed according to the particular application involved.

Figure 4:
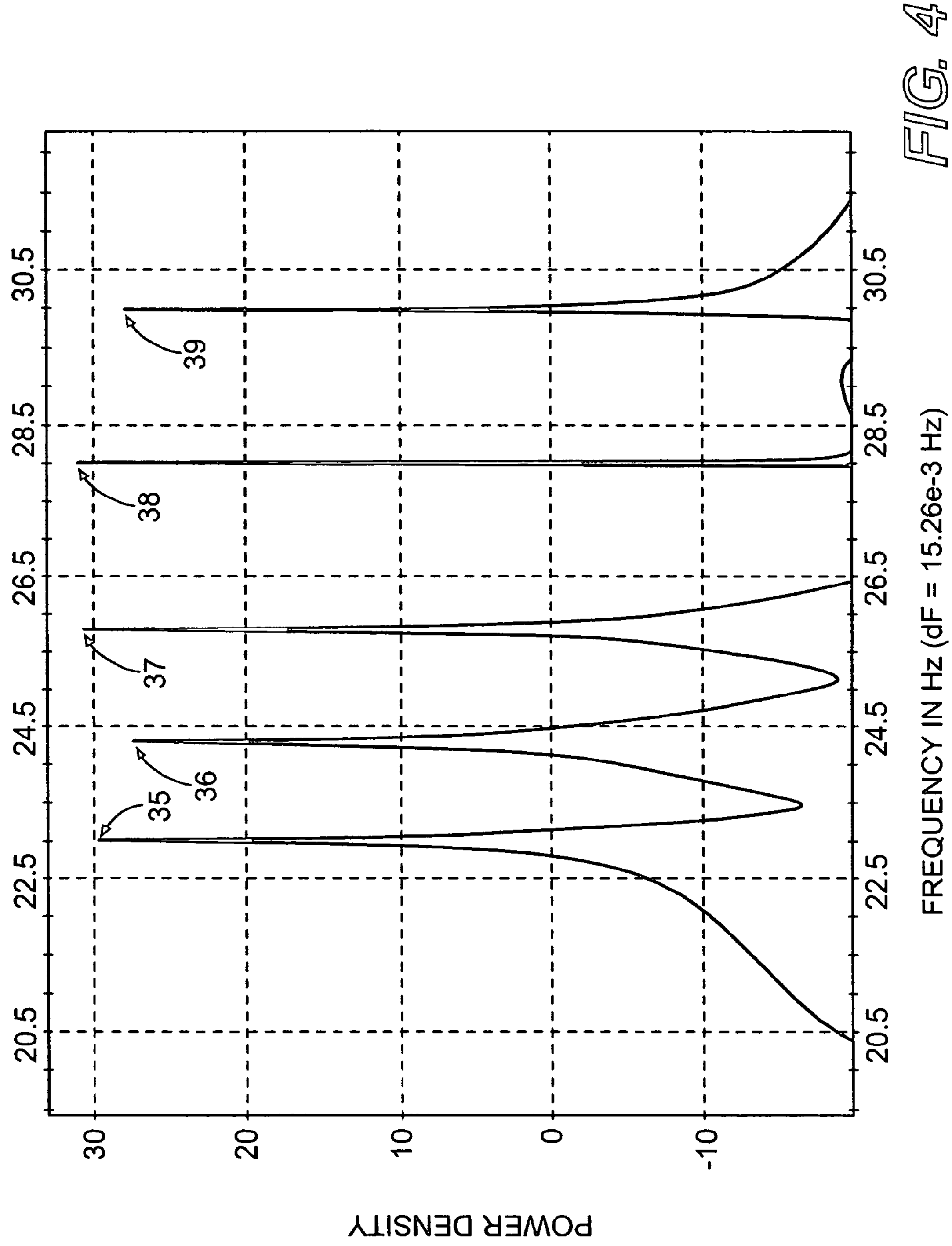
FIG. 4 is a graph showing an exemplary information signal that could be sent from the transmitter segment to the receiver segment shown in FIG. 1.

FIG. 4 is a graph showing an exemplary information signal that could be sent from the transmitter segment (FIG. 1) to the receiver segment (FIG. 3). Frequency in hertz is shown on the horizontal axis, and Power Density measured in watts/hertz is shown on the vertical axis. Waveforms 35-39 represent information that is to be transmitted. This information is received and then scrambled for retransmission. Though the graph shows the information signals within a particular bandwidth and with specific power densities, these characteristics can be adjusted according to the particular application involved.

Figure 5:
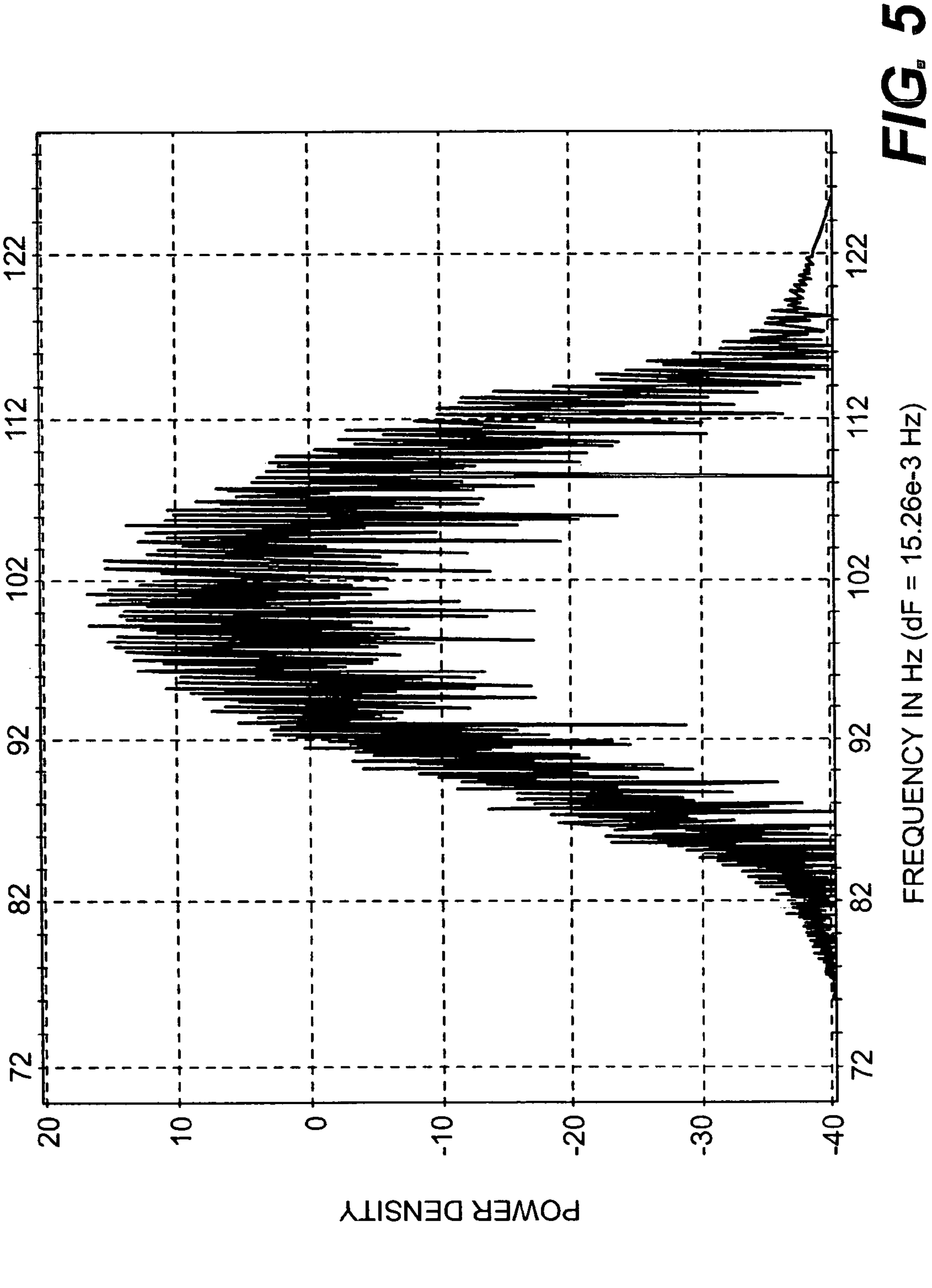
FIG. 5 is a graph showing scrambled information signal.

FIG. 5 is a graph showing a scrambled information signal. This signal can be generated, for example, by the frequency converter 22 (FIG. 1) combining the IF signal 18 and the local oscillator signal 27 (FIG. 1). As shown in FIG. 5, the resulting signal has a gaussian distribution. This gaussian distribution signal includes the scrambled information signals 35-39 shown in FIG. 4. But, waveforms 35-39 can no longer be electronically detected without knowledge of the correct password 24 (FIG. 1). This scrambled data can now be safely transmitted.

Figure 6:
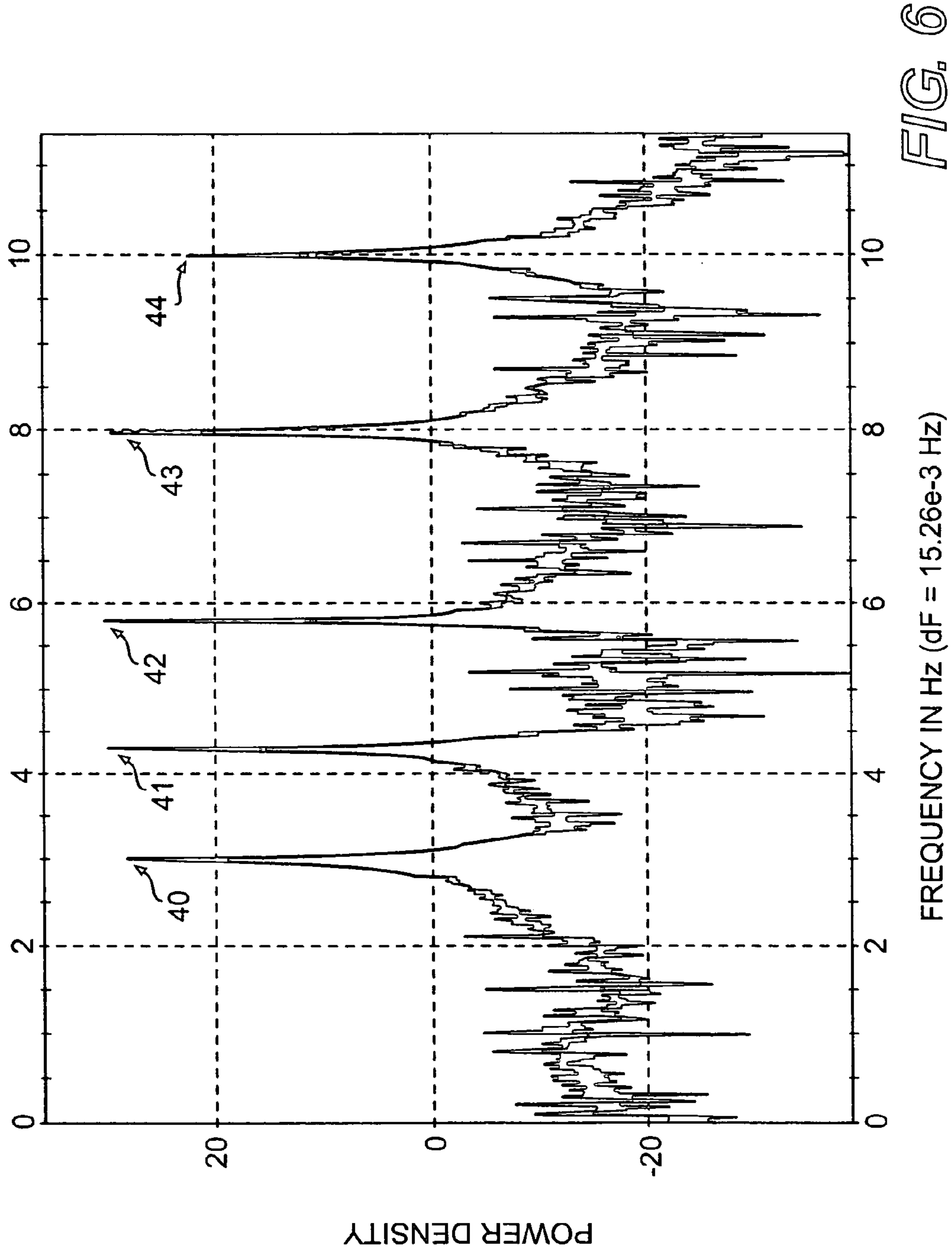
FIG. 6 is a graph showing the de-scrambled output of the receiver segment frequency converter shown in FIG. 3.

FIG. 6 is a graph showing the de-scrambled output of the receiver segment frequency converter 34 shown in FIG. 3. Ideally, the waveforms shown in this graph should be identical to the waveforms shown in FIG. 4, but in practice they will have differences. When the outputs of the voltage controlled oscillator 31 and the voltage controlled oscillator 23 are electrically similar, the energy at the output of the frequency converter 34 becomes stronger, as discussed in FIG. 3. The original information signals can now be detected. Waveforms 40-44 correspond to the original information signals 35-39, respectively.

Figure 7:
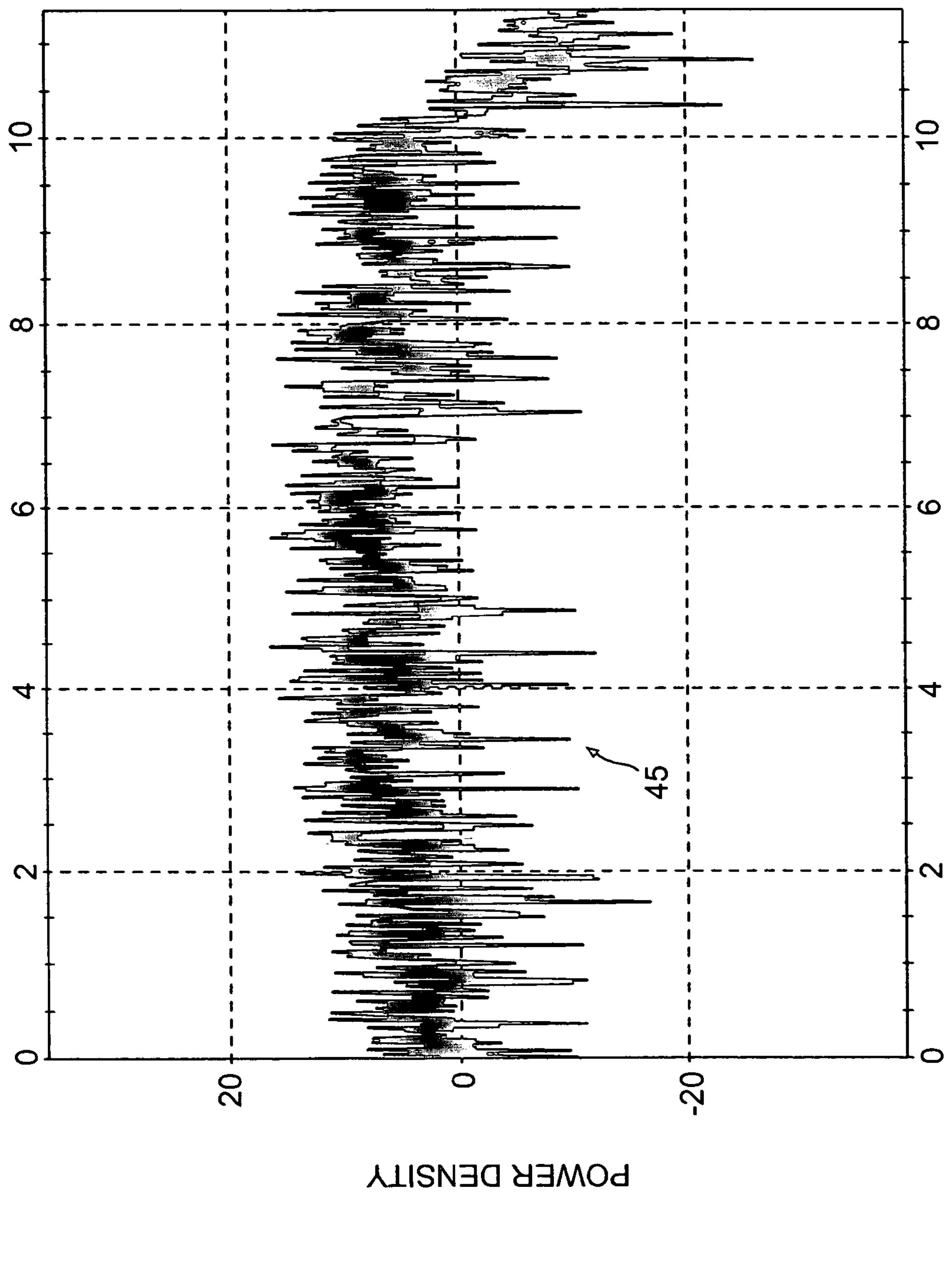
FIG. 7 is a graph showing the output of the receiver segment frequency converter when an unauthorized user attempts to de-scramble a transmitted signal in accordance with the present invention.

FIG. 7 is a graph showing the output of the receiver segment frequency converter 34 when an unauthorized user attempts to de-scramble a transmitted RF signal 19 (FIG. 1) in accordance with the present invention. When an incorrect password 30 is used at the receiving end, the user will not be able to recover the original information signal (FIG. 4), and an unintelligible waveform 45 such as shown in FIG. 7 will result. This type of waveform can also result from significant discrepancies between the operation of any of the components of the transmitter and receiver.

Figure 8:
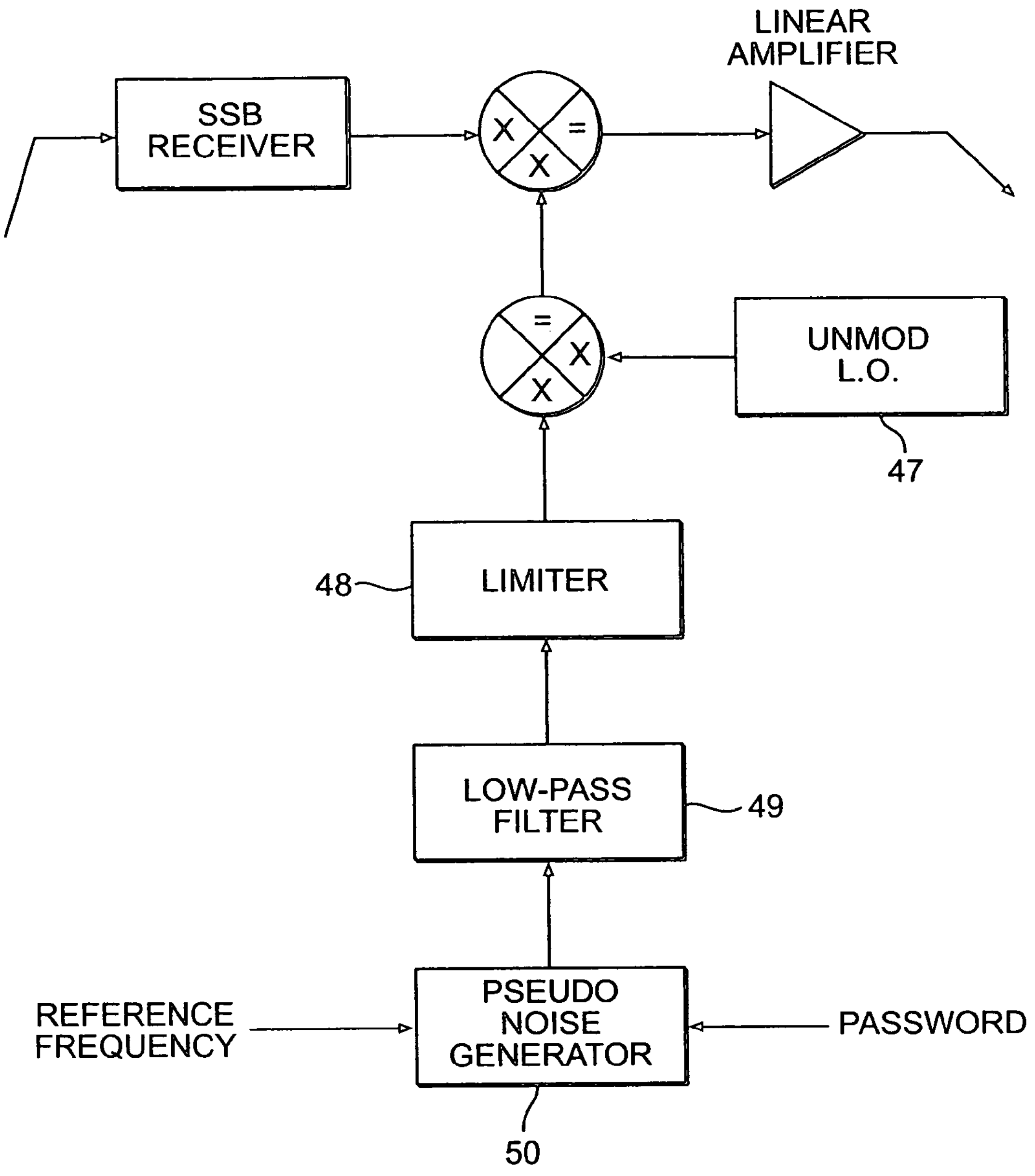
FIG. 8 is a block diagram of another exemplary embodiment of a transmitter in accordance with the present invention.

FIG. 8 is a block diagram of another exemplary embodiment of a transmitter in accordance with the present invention. The transmitter can be ground, air, or space based. The function of the embodiment shown in FIG. 8 is the same as the function of the exemplary embodiment shown in FIG. 1. However, the method of generating a gaussian frequency distribution is different. As with the pseudo-random noise generator 26 discussed with respect to FIG. 1, a pseudo-random noise generator 50 generates bits of a digital pseudo-random noise signal. The pseudo-random noise signal is then filtered by a low pass filter 49. In FIG. 1, the signal is then sent to a voltage controlled oscillator. However, in the FIG. 8 embodiment, the signal is sent to a limiter 48 in order to remove amplitude variations. The signal is then combined with an un-modulated output of local oscillator 47. This combining operation connects the random noise signal into a signal having a gaussian frequency distribution. This gaussian frequency distribution signal is then combined with the intermediate frequency signal in a manner similar to that described with regard to FIG. 1.

Figure 9:
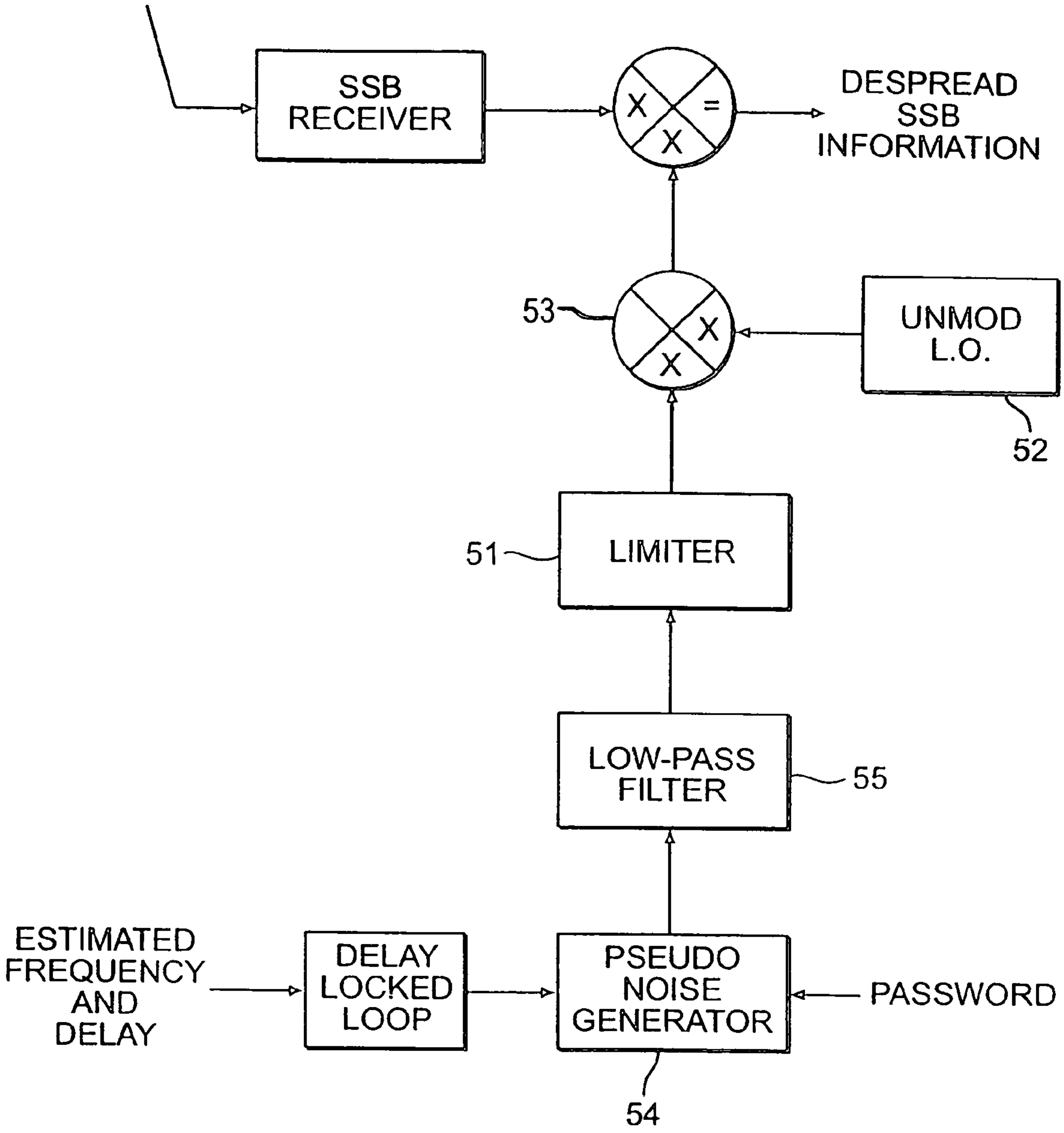
FIG. 9 is a block diagram of an exemplary embodiment of a receiver that complements the transmitter shown in FIG. 8.

FIG. 9 is a block diagram of an exemplary embodiment of a receiver that complements the transmitter shown in FIG. 9. The function of the receiver embodiment shown in FIG. 9 is the same as the receiver embodiment shown in FIG. 3. However, the random signal that is generated by the pseudo random noise generator 54 and the low pass filter 55 is sent to a limiter 51. The limiter functions to remove amplitude variations in the random noise signal. In order to generate a gaussian frequency distribution that will subsequently be used to de-scramble the scrambled signal, the output of the limiter 51 is combined with an un-modulated output of local oscillator 52 by a balanced modulator 53. Aside from the alternate method of generating the gaussian frequency distribution, the operation of this embodiment is similar to the embodiment shown in FIG. 3.

Although the invention has been described with reference to particular embodiments, it will be understood to those skilled in the art that the invention is capable of a variety of alternative embodiments within the spirit of the appended claims.

The invention claimed is:

1. An analog signal scrambler, comprising:

a receiver for receiving an analog signal and converting the analog signal into an intermediate frequency signal;

a generator for generating a pseudo-random gaussian frequency distribution signal; and a frequency converter for multiplying the intermediate frequency signal and the pseudo-random gaussian frequency distribution signal, thereby scrambling the analog signal, wherein said generator comprises:

a pseudo-random noise generator for generating a pseudo-random noise signal based on a password, a filter for filtering the pseudo-random noise signal, and a converter for converting the filtered pseudo-random noise signal into the pseudo-random gaussian frequency distribution signal.

2. The analog signal scrambler according to claim 1, wherein said receiver is a single side band receiver that converts the analog signal into a single side band intermediate frequency signal.

3. The analog signal scrambler according to claim 1, wherein said frequency converter multiplies the intermediate frequency signal and the pseudo-random gaussian frequency distribution signal to form a radio frequency signal.

4. An analog signal de-scrambler, comprising:

a receiver for receiving a scrambled analog signal and converting the scrambled analog signal into an intermediate frequency signal;

a generator for generating a pseudo-random gaussian frequency distribution signal; and a frequency converter for multiplying the intermediate frequency signal and the pseudo-random gaussian frequency distribution signal, thereby de-scrambling the scrambled analog signal, wherein said generator comprises:

a pseudo-random noise generator for generating a pseudo-random noise signal based on a password used for scrambling the scrambled analog signal, a filter for filtering the pseudo-random noise signal, and a converter for converting the filtered pseudo-random noise signal into the pseudo-random gaussian frequency distribution signal.

5. The analog signal de-scrambler according to claim 4, wherein said receiver is a single side band receiver that converts the scrambled analog signal into a single side band intermediate frequency signal.

6. A secure analog signal transmission system, comprising:

a transmitting unit, which comprises:

a first receiver for receiving an analog signal and converting the analog signal into a first intermediate frequency signal;

a first generator for generating a first pseudo-random gaussian frequency distribution signal, wherein said first generator comprises:

a first pseudo-random noise generator for generating a first pseudo-random noise signal based on a password, a first filter for filtering the first pseudo-random noise signal, and a first converter for converting the filtered first pseudo-random noise signal into the first pseudo-random gaussian frequency distribution signal; and a first frequency converter for multiplying the first intermediate frequency signal and the first pseudo-random gaussian frequency distribution signal, thereby scrambling the analog signal; and a receiving unit, which comprises:

a second receiver for receiving the scrambled analog signal from said transmitting unit and converting the scrambled analog signal into a second intermediate frequency signal;

a second generator for generating a second pseudo-random gaussian frequency distribution signal; and a second frequency converter for multiplying the second intermediate frequency signal and the second pseudo-random gaussian frequency distribution signal, thereby de-scrambling the scrambled analog signal, wherein said second generator comprises:

a second pseudo-random noise generator for generating a second pseudo-random noise signal based on the password, a second filter for filtering the second pseudo-random noise signal, and a second converter for converting the filtered second pseudo-random noise signal into the second pseudo-random gaussian frequency distribution signal.

7. The system according to claim 6, wherein said first receiver is a single side band receiver that converts the analog signal into a first single side band intermediate frequency signal.

8. The system according to claim 6, wherein said first frequency converter multiplies the first intermediate frequency signal and the first pseudo-random gaussian frequency distribution signal to form a radio frequency signal.

9. The system according to claim 6, wherein said second receiver is a single side band receiver that converts the scrambled analog signal into a second single side band intermediate frequency signal.

10. The system according to claim 6, wherein said transmitting unit further comprises a linear amplifier for amplifying the scrambled analog signal for transmission.

* * * * *

UNITED STATES PATENT AND TRADEMARK OFFICE

CERTIFICATE OF CORRECTION

PATENT NO. : 7,333,608 B2
APPLICATION NO. : 11/152113
DATED : February 19, 2008
INVENTOR(S) : Jack Elias Seitner It is certified that error appears in the above-identified patent and that said Letters Patent is hereby corrected as shown below:

In column 4, line 2: “24” should read --29--.

In column 6, line 5: “connects” should read --converts--.

Signed and Sealed this

Seventh Day of October, 2008

JON W. DUDAS
*Director of the United States Patent and Trademark Office*